United States Patent [19]

Dustan et al.

[11] Patent Number: 5,884,312
[45] Date of Patent: Mar. 16, 1999

US005884312A

[54] SYSTEM AND METHOD FOR SECURELY ACCESSING INFORMATION FROM DISPARATE DATA SOURCES THROUGH A NETWORK

[75] Inventors: Robert Frederick Dustan, Bowmanville; Dirk A. Vieira, Etobicoke, both of Canada

[73] Assignee: Electronic Data Systems Corporation, Plano, Tex.

[21] Appl. No.: 810,498

[22] Filed: Feb. 28, 1997

[51] Int. Cl.$^6$ .................................................. G06F 17/30
[52] U.S. Cl. .................... 707/10; 395/200.36; 395/200.3
[58] Field of Search .................. 707/1–10, 100–104, 707/200–206; 395/200.33, 200.36, 671, 676; 379/112, 115, 114

[56] References Cited

U.S. PATENT DOCUMENTS

| | | | |
|---|---|---|---|
| 5,495,522 | 2/1996 | Allen et al. | 379/202 |
| 5,586,175 | 12/1996 | Hogan et al. | 379/112 |
| 5,694,601 | 12/1997 | White | 395/671 |
| 5,742,769 | 4/1998 | Lee et al. | 395/200.36 |

FOREIGN PATENT DOCUMENTS

WO 96/42041  12/1996  WIPO .

OTHER PUBLICATIONS

Computer Networks System and ISDN Systems, vol. 27, No. 6, Apr. 1995, Anderson et al., entitled "Sessioneer: flexible session level authentication with off the shelf server and clients".

Document, Richard S. Naszcyniec, Jr., "Programming Guidelines for Processing Data In Stored Procedures and Open Servers for EDS Canada, " SYBASE Professional Services, version dated Oct. 3, 1996 pp. 1–5.

Technical Paper Series, "Understanding Open Server With Customer Success Stories," SYBASE, 1995, pp. 1–32.

Brochure, "Sybase web.sql," SYBASE, 1996, one page front and back.

Brochure, "Sybase SQL Server 11, " SYBASE, 1995, four pages, front and back, not numbered.

Fold–out Brochure, "Sybase Open Client & Open Server, " SYBASE, 1994, three pages, front and back, not numbered.

Technical Paper, "Persistent Client State HTTP Cookies," Netscape Communications Corporation, http:/home.netscape.com/newsref/std/cookie—spec.html, Feb. 24, 1997, pp. 1–4.

Technical Paper, "'Cookies' (client–side persistent information) and their use," http://www.ids.net/~oops/tech/refl.html, Feb. 24, 1997, pp. 1–2.

*Primary Examiner*—Thomas G. Black
*Assistant Examiner*—Ruay Lian Ho
*Attorney, Agent, or Firm*—Wei Wei Jeang; L. Joy Griebenow

[57] ABSTRACT

A method for securely accessing information from disparate data sources through a network is provided. The method includes requesting a logon menu from a network server using a client and receiving a logon menu. The method further includes communicating a logon input to the network server which then communicates the logon input to a database server. Next, the method includes verifying the logon input at the database server and generating and storing a unique session identification number at the database server in response. The method continues by communicating the session identification number and a portion of the logon input to the client and storing, and communicating a menu to the client prompting the user to perform at least a first function requiring access to a first type of disparate data source. Next, the method includes requesting the first function and communicating the session identification number, the portion of the logon input, and the first function request to the network server from the client. Next, the method includes providing this information to the database server and verifying that the session identification number and the portion of the logon input are valid. Finally, the method includes exchanging information between the database server and the first type of disparate data source while performing the first function, and then generating a first output at the network server that is provided to the client in response.

20 Claims, 8 Drawing Sheets

SYSTEM AND METHOD FOR SECURELY ACCESSING INFORMATION FROM DISPARATE DATA SOURCES THROUGH A NETWORK

TECHNICAL FIELD OF THE INVENTION

The present invention relates generally to the field of computers and more particularly to a system and method for securely accessing information from disparate data sources through a network.

BACKGROUND OF THE INVENTION

The increased popularity of the Internet and the development of the World Wide Web (WWW) has resulted in the creation of new business opportunities. One such business opportunity is that of Internet commerce or on-line commerce. On-line commerce involves the exchange of goods, services, and information as a result of transactions executed using an on-line computer system. On-line commerce is often achieved using a computer application and system that allows access to information from disparate data sources through a computer network, such as the Internet. To support on-line commerce, it is of paramount importance that the underlying computer application and system provide: (1) relevant information, often from disparate data sources, in a timely and accurate manner; and (2) a secure means for allowing access to a user's account and the disparate data sources used by the system. Primarily, users do not want unauthorized access to their account information and information providers do not want unauthorized access to their data sources and systems.

On-line commerce computer applications and systems are difficult to design and implement, frequently taking years to develop, and provide either too little security or a level of security that is too cumbersome in actual operation and hence unacceptable. In particular, the development of computer applications and systems requiring interprocess communication for access to disparate data sources is complex and time consuming. Disparate data sources include information or data from such sources as databases, application programs, or systems that reside on multiple and disparate platforms, database management systems, and environments that may be physically separated from one another. The design difficulties and complexities arise from the interface software that must be developed for each disparate data source to ensure that information can be accessed from each disparate data source in a timely and accurate manner. The interface software is difficult and complex to develop because each disparate data source may have a different or proprietary method and format or protocol for exchanging data. The format or protocol peculiarities of each disparate data source must be taken into account and coded into the interface software. Often, the difficulties and delays in designing the interface software adversely affect the development and implementation of other portions of the on-line commerce application and system, which further increases overall system development time and costs.

The proper exchange of information between disparate data sources is especially critical when the information is time sensitive. Time sensitive data is any data that frequently changes. For example, on-line commerce computer applications and systems involving the trading of securities, such as stocks, bonds, notes, options, futures, mutual funds, and the like, rely heavily on time sensitive data to ensure that trades are timely placed and that decisions are based on accurate and up-to-date information.

As mentioned above, another significant problem encountered when developing on-line commerce computer applications and systems is that of overall system security. Systems must be secure enough to prevent unauthorized access to a user's account and unauthorized access to the various disparate data sources. Unfortunately, security in many systems is either easily defeated by the unscrupulous computer hacker or is so tedious and cumbersome that users find the system too cumbersome to use. Security is especially a problem in systems implemented using the Internet or corporate intranets where clients are not continuously in direct communication with the on-line commerce system. In such arrangements, the client communicates with the on-line commerce system through a network of servers opening up the possibility to unauthorized access of sensitive information while in transit. This arrangement also presents the disadvantage of preventing the on-line system from determining when a session has started and when a session has ended because of the absence of the continuous communications path by which the system can easily determine when a user has logged on or out. This presents the opportunity for two users, the second of which may be an unauthorized user, to logon at the same time under the same account number or user identification number.

Some prior attempts at providing a system for securely accessing information from disparate data sources have provided too little security. For example, an unauthenticated security system allows access to one of the disparate data sources by anyone having access to a web server and may allow one user to break into another's session. This is unacceptable to most users and information providers.

Still other prior attempts at providing a system for securely accessing information from disparate data sources have provided a security system that is too burdensome and inflexible. For example, some of these security systems require user identification numbers that are different from a user's account number, thus requiring the user to remember yet another number, in addition to an account number and password. Also, some security systems require passwords and logon identifications for each disparate data source. This greatly increases the overall system administrative burden because databases containing valid passwords and logon identifications (or user account numbers) must be maintained at multiple locations using different technologies. Whenever a new user is added or deleted or when an existing user changes a password, this information must be changed at multiple locations. The availability of the user information at multiple locations also increases the risk of unauthorized internal access by personnel having access at the various locations. Some other security systems require an Internet or intranet user to exit their web browser before starting a new session with their on-line system or after changing a password. This is unacceptable to many users.

Other attempts at system security have focused on maintaining a user database of valid passwords and logon identifications at a database on a web server. These types of security systems do not provide the added security of insulating the user database from web server personnel. These security systems also frequently fail to provide the added security feature of allowing permissions and rights to be assigned to individual users or groups of users to limit access to certain data sources.

SUMMARY OF THE INVENTION

From the foregoing it may be appreciated that a need has arisen for a system and method for securely accessing information from disparate data sources through a network that eliminate or reduce the problems of prior techniques. In accordance with the present invention, a system and method for securely accessing information from disparate data sources through a network are provided which substantially eliminate the disadvantages and problems outlined above. The present invention provides session management even when implemented using the Internet or using a corporate intranet when direct communication is not continuously provided.

According to an embodiment of the present invention, a method for securely accessing information from disparate data sources through a network is provided. The method includes requesting a logon menu from a network server using a client and receiving a logon menu at the client. Next, the method includes communicating a logon input to the network server and communicating the logon input from the network server to a database server. The method then includes verifying that the logon input is a valid logon input at the database server, and generating and storing a unique session identification number at the database server in response to successfully verifying that the logon input is a valid logon input. Next, the method includes communicating the session identification number and a portion of the logon input to the client and storing this information at the client.

The method then includes communicating a menu to the client prompting the user to perform at least a first function requiring access to a first type of disparate data source and a second function requiring access to a second type of data source. A user may then request the first function where the method responds by communicating the session identification number, the portion of the logon input, and the first function request to the network server, where the network server communicates this information to the database server. At this point the method includes verifying at the database server that the session identification number and the portion of the logon input are valid, and exchanging information between the database server and the first type of disparate data source while performing the first function. Finally, the method includes generating a first output in response to performing the first function and communicating the first output to the client.

According to another embodiment of the present invention, a system for securely accessing information from disparate data sources through a network is provided that includes a client, a network server, a database server, and a disparate data source. The client includes volatile memory and is enabled with a web browser to provide a request to the network server and to store and exchange a session identification number and an account number with the network server. The network server provides the session and account information to the database server and executes a script in response to receiving the request. The database server receives the session identification number and account information and includes a database management system that executes a first function stored procedure in response to the script of the network server. The first function stored procedure executes another stored procedure to verify the session and account information with a user table and then executes a corresponding first function registered procedure to request information from the first disparate data source.

The present invention provides a myriad of technical advantages including the capability to securely access information from disparate data sources while performing session management. The session management includes timing a session, logging requests and activity, and verifying a session identification number each time a user makes a request. The session management is preferably transparent to the user and is performed using an encrypted session identification number. Another technical advantage of the present invention, in one embodiment, includes a system architecture in which a database server is provided separately from a web server and a network to further secure access to the disparate data sources and to further secure the user data such as account numbers and passwords. A further technical advantage of the present invention includes the presence of one user database or system that is used to store all passwords and account numbers to minimize access and to perform all security system verifications, authorizations, and encryptions at one location.

Additional technical advantages of the present invention include the capability to prevent more than one user from accessing the system using the same account number at the same time. Yet another technical advantage of the present invention includes the capability to access the present invention using any of a variety of clients such as an interactive voice response system or a web browser-enabled computer. Another technical advantage of the present invention includes a security system and method that provides both authorization and authentication to check for user and group privileges/rights before allowing access to a particular data source or function. Further technical advantages include activity logging and audit logging of all transactions or functions performed by a user, and the capability to end a session if no activity is received within a predefined time period. Yet another technical advantage is a common interface, such as an application program interface, to access the disparate data sources. This allows for a presentation layer, such as a client interface, to be developed independently from and in parallel with the application and data layers of the system, resulting in faster overall system development. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
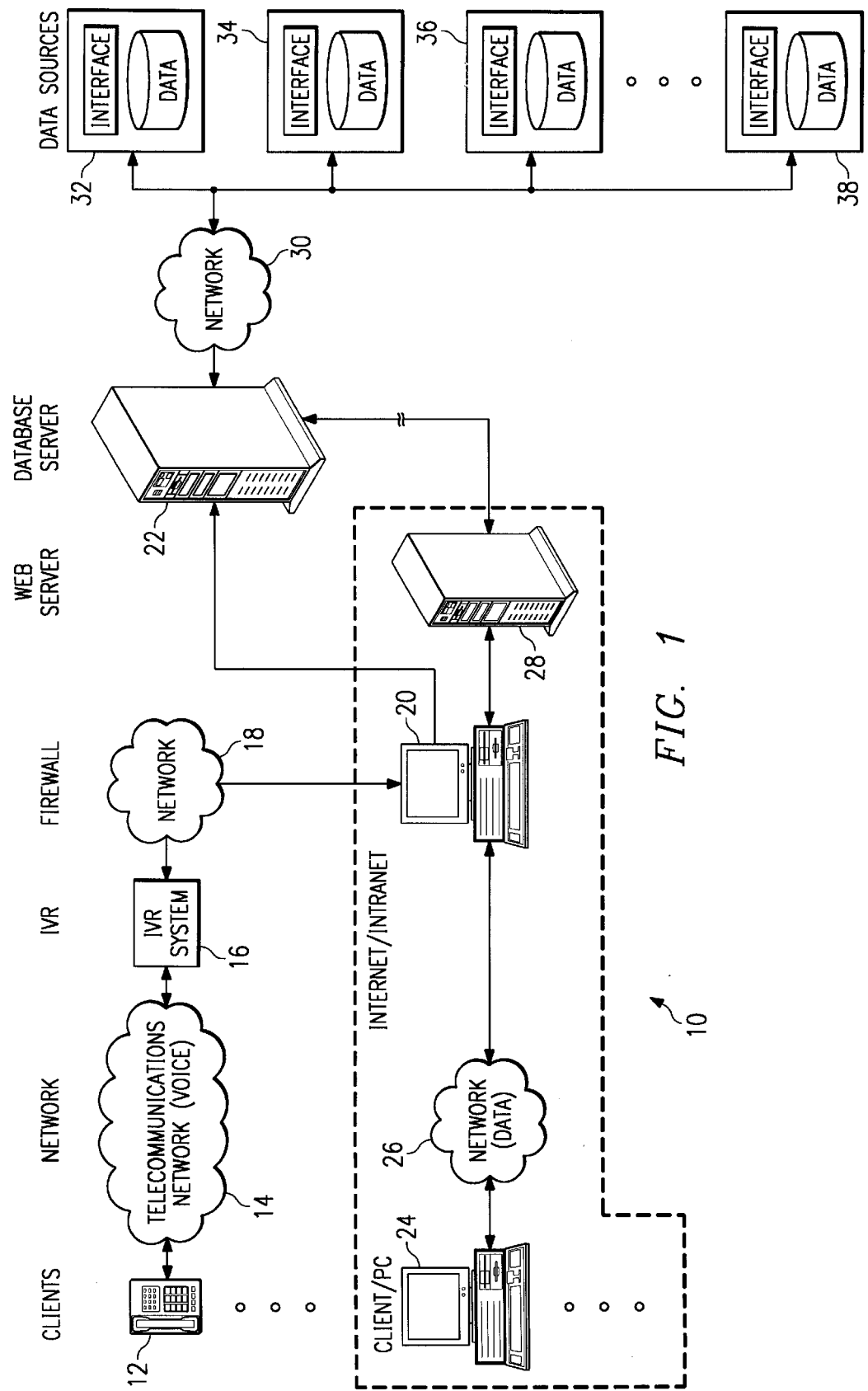
FIG. 1 is an overview diagram illustrating a network configured as a system for securely accessing information from disparate data sources.

Turning first to the nomenclature of the specification, the detailed description which follows is represented largely in terms of processes and symbolic representations of operations by conventional computer components, including a central processing unit (CPU) or processor associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process or method is generally considered to be a sequence of computer-executed steps or instructions leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer or computers.

In addition, it should be understood that the programs, processes, methods, etc. described herein are but an example of one implementation of the present invention. The present invention is not limited to any one particular computer, apparatus or computer language. Rather, the present invention may be practiced using various types of general purpose computing machines or devices executing programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory.

Referring now in more detail to the drawings, FIG. 1 is an overview diagram illustrating a network configured as a system 10 for securely accessing information from disparate data sources. System 10, in one embodiment, may be implemented as an on-line commerce computer application and system, such as an on-line brokerage application that allows users to receive portfolio information, check stock prices, and to execute stock transactions. While an on-line brokerage application will be used throughout this description of the invention, it is used only as an example of the types of applications to which the present invention may be used, and should in no way be construed to limit the present invention.

Figure 5:
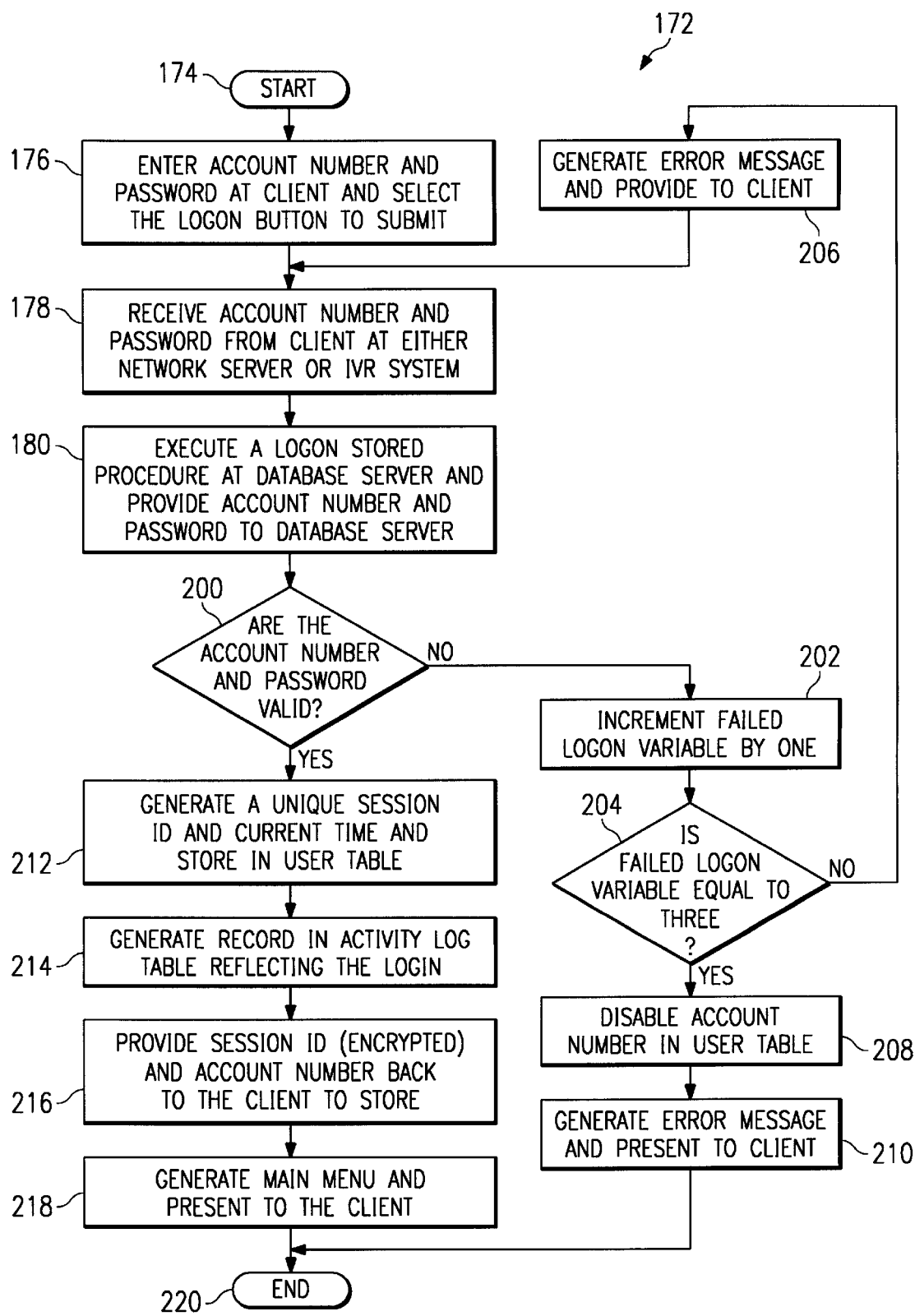
FIG. 5 is a flowchart illustrating an exemplary method for performing a logon process.
Figure 6:
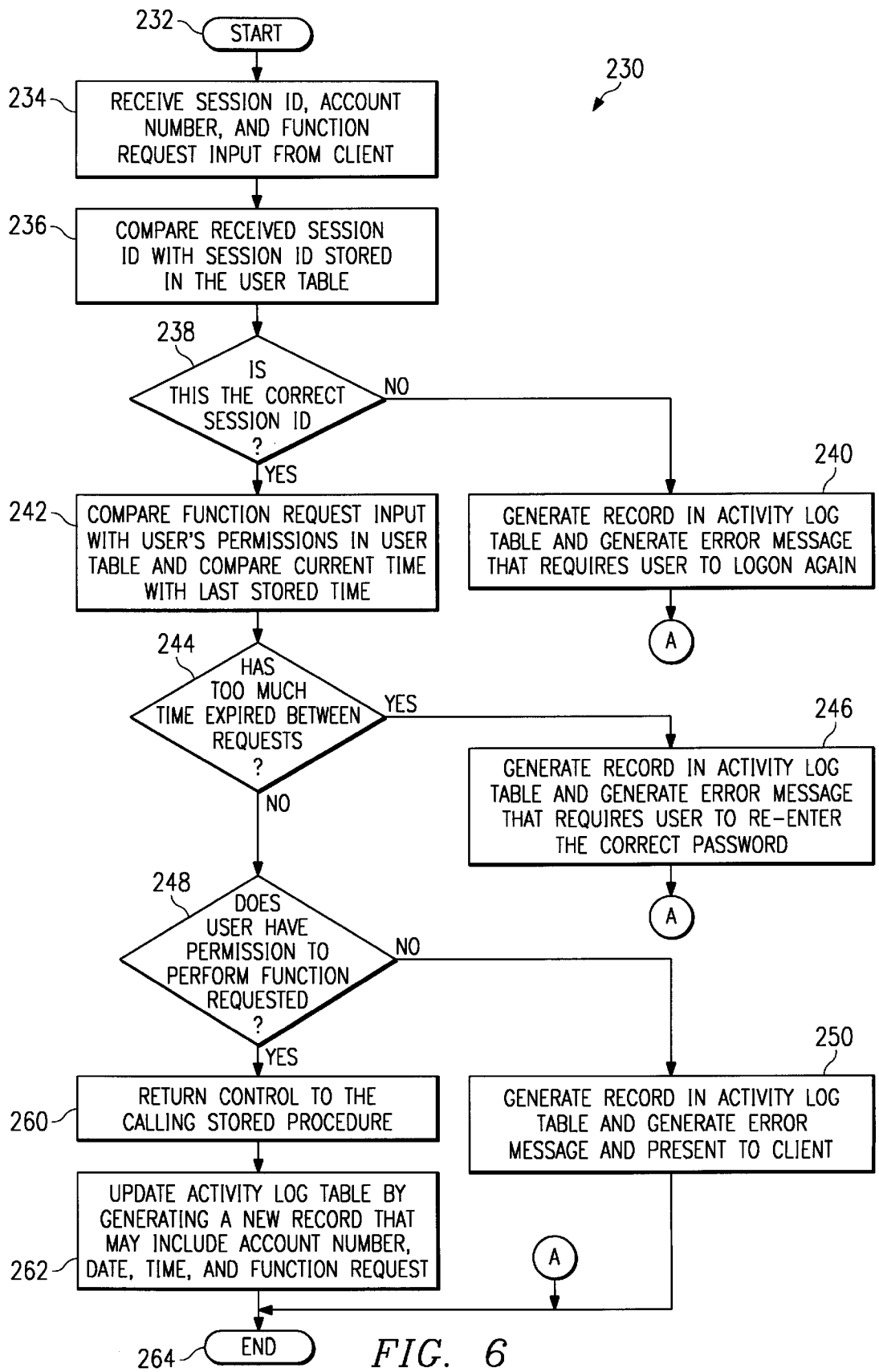
FIG. 6 is a flowchart illustrating an exemplary method for performing a check access process.
Figure 7:
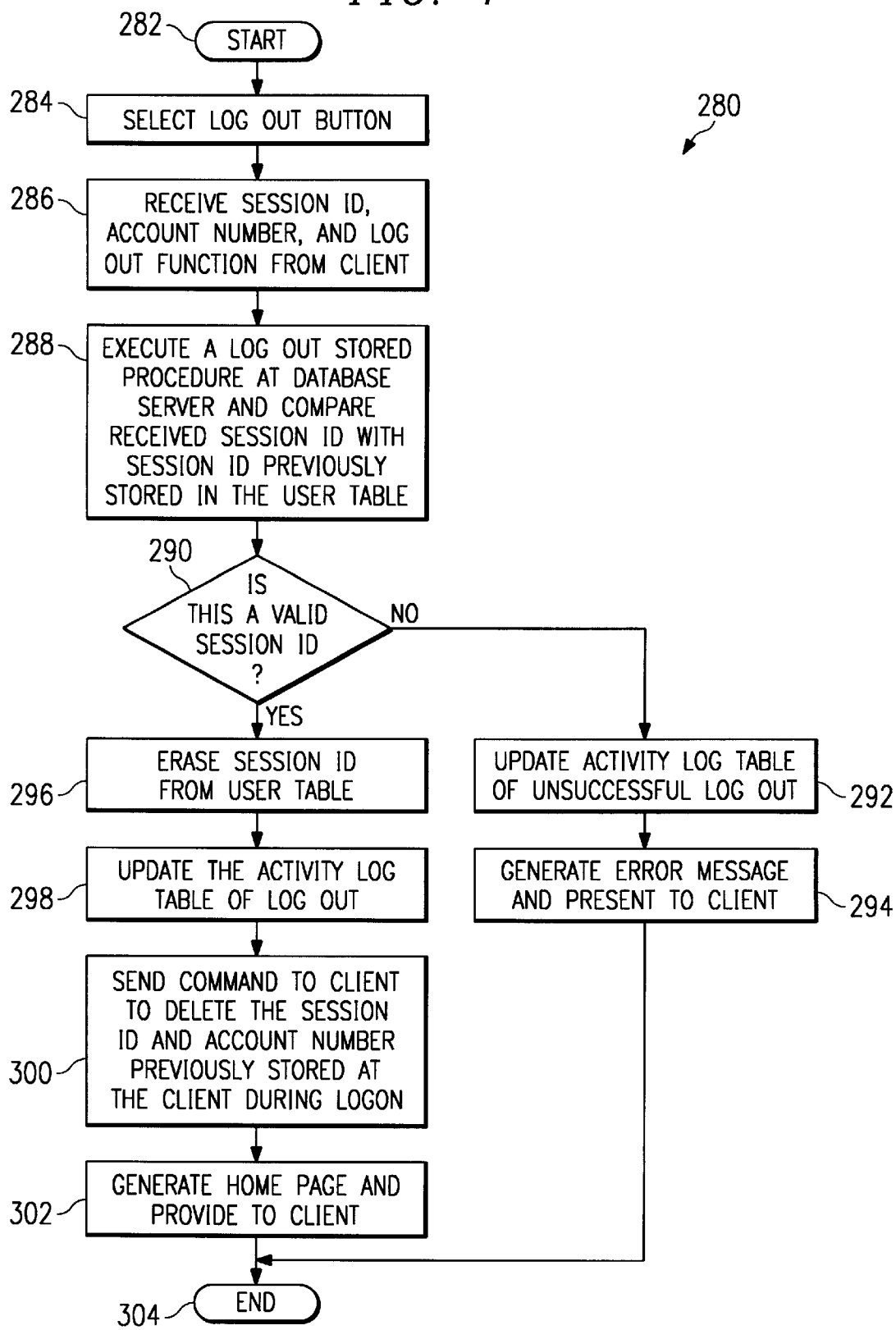
FIG. 7 is a flowchart illustrating an exemplary method for performing a log out process.

System 10 may be implemented using the Internet or using a corporate intranet and allows multiple clients to access information from virtually any data source, including various disparate data sources, while providing security functions and session management. Generally, the security functions of system 10 may be divided into a logon process, a check access process, and a log off process. The security functions are described in more detail below and are illustrated in FIGS. 5–7.

A telephone 12 is provided as a client to system 10 and couples to a telecommunications network 14. Telecommunications network 14 may be a voice or public telephone communications network that provides voice communication. Telecommunications network 14 couples to an interactive voice response (IVR) system 16 so that information may be exchanged between telephone 12 and IVR system 16. IVR system 16 may be any termination device that allows a user of telephone 12 to initiate certain actions in response to prompts by IVR system 16. For example, IVR system 16 may present a voice menu to the user of telephone 12 to which the user may respond by pressing appropriate buttons generating dual-tone, multi-frequency (DTMF) tones generated by telephone 12. In an alternative embodiment, IVR system 16 may recognize voice commands from the user of telephone 12.

IVR system 16 couples to a database server 22 through a network 18 and a firewall 20. Network 18 may be any network such as a data or voice network that allows data to be exchanged between IVR system 16 and database server 22. Firewall 20 provides added security to system 10 by preventing unauthorized user access to both database server 22 and a web server 28. In one embodiment, firewall 20 may be implemented using software on a personal computer as shown in FIG. 1. Firewall 20 will preferably include dedicated hardware and software systems that screen network traffic and validate the flow of information between both database server 22 and IVR system 16 and between database server 22 and a web server 28 and the various clients of system 10. The present invention may employ any known or available physical configurations or software implementations of a firewall. When access is allowed, firewall 20 provides the information from network 18 directly to database server 22. Thus, telephone 12 accesses database server 22 through the path just described.

Database server 22 includes various stored procedures that may be executed in response to requests and information received from IVR system 16, as directed by a user of telephone 12. Database server 22, in a preferred embodiment, will include database management system software, such as a relational database management system, that allows for various stored procedures and registered procedures to be executed at database server 22 in response to inputs or commands received from IVR system 16. The stored procedures may be thought of as computer programs or application program interfaces that may be directly called by the database management system software to access various disparate data sources. The stored procedures serve as application program interfaces to the presentation layer of system 10. The presentation layer serves as the user interface or presentation interface that is provided to the user. When a user requests a particular function of system 10 that requires access to a disparate data source, a stored procedure is called by the database management system software. In turn, the stored procedure calls a registered procedure that serves as a direct interface to the desired disparate data source and allows access to the disparate data source.

The various data sources of system 10 are also shown in FIG. 1 as a data source 32, a data source 34, a data source 36, and a data source 38. Database server 22 may communicate with the various data sources through any network, such as network 30, or using multiple networks. Network 30 allows data or information to be exchanged between database server 22 and a chosen data source.

The data sources that are directly compatible with the database management system of database server 22 are not considered to be disparate data sources and can be accessed by the database management software using only a stored procedure. Normally, such data sources were originally created using the same database management system that resides on database server 22. All other data sources that are not considered to be directly compatible with the database management system of database server 22 may be referred to as disparate data sources. Disparate data sources must use a stored procedure to call a unique or specially written interface, such as a registered procedure, to access the disparate data source. The advantage of being directly compatible with the database management system is that the interface or application program interface is easily developed and generally does not require the development of a unique, separate routine, such as a registered procedure, to properly interface with the disparate data source and the database management system. However, it should be understood that according to the present invention, even a disparate data source, whether a database, an application program, or any other system capable of receiving an input and generating an output, will interface directly with the presentation layer, such as web server 28 and IVR system 16, in the same or similar manner as a data source that is not a disparate data source. This will occur using the stored procedure or common interface that allows development of the presentation layer to proceed independently from the development of any registered procedure or other interface routine that may need to be developed.

After database server 22 executes the desired stored procedure or registered procedure as desired by the user of telephone 12, the accessed information is provided back to IVR system 16. IVR system 16, in response, generates a corresponding output and provides the requested information to telephone 12. The user of telephone 12 may then perform additional functions or may log out of system 10.

A separate path from a client to the various disparate data sources is provided using client 24. Client 24 may be a personal computer enabled with a web browser and connected to the Internet. For example, client 24 may be running the NETSCAPE NAVIGATOR web browser and using a modem to couple to the server of an Internet Service Provider. The Internet Service Provider, not shown in FIG. 1, may be any node or server on the Internet and may be in communication with client 24 using a dedicated communications path or a public telecommunications network such as a network 26 as shown in FIG. 1.

Client 24 may access web server 28 by entering an appropriate address or uniform resource locator (URL) that identifies a particular document or web page stored on web server 28. As such, in one embodiment, client 24 communicates through its Internet Service Provider using network 26 to access web server 28, after going through firewall 20 for added security.

Web server 28 may be implemented using any computer, such as, for example, a SUN work station using the UNIX operating system and running a web server program that accepts requests for information framed according to the HyperText Transport Protocol (HTTP). Web server 28 processes these requests and sends the requested documents to the requesting client according to the client's Internet address which, in one embodiment, may be provided according to the Transmission Control Protocol, Internet Protocol (TCP/IP). Web server 28 will, preferably, run a web server program such as NETSCAPE COMMERCE SERVER or NETSCAPE ENTERPRISE SERVER.

The web server program allows web browser-enabled clients of the Internet or web browser-enabled clients of a corporate intranet to receive graphical documents that are either stored at web browser 28 and identified by a specific URL or generated using a particular script at web browser 28 also identified by a specific URL. The scripts are computer programs stored in a scripting language or programming language that may be implemented according to the Common Gateway Interface (CGI) standard or the NETSCAPE SERVER APPLICATION PROGRAM INTERFACE (NSAPI) or similar web server API that describes how web servers of the WWW should access external programs so that data is returned to the client in the form of an automatically generated web page. Scripts are normally needed when the user fills out onscreen forms which the script uses as an input to bring about the execution of other programs as needed. Ultimately, the scripts generate a web page to provide as an output to the web browser-enabled client. The web pages will generally be provided as a text file encoded with a declarative markup language (DML) such as the Standard Generalized Markup Language (SGML) or, preferably, with HyperText Markup Language (HTML).

The user at client 24 may request a particular function that corresponds to a script stored at web browser 28 which results in a communication to database server 22 through a communications link. When requesting access to information at any of the disparate data sources, the script of web browser 28 will generally request that database server 22 execute a predefined stored procedure, which then calls a registered procedure, to allow the database management system of database server 22 to access a particular disparate data source such as data source 32. As a result, data source 32 will provide information or data back to the stored procedure at database server 22 which then provides the information or data back to the script at web browser 28. Then, the receiving script, using the web server program, generates a corresponding web page illustrating the desired information or data and provides the web page to the user of client 24.

As an example of the operation of system 10, assume that system 10 is implemented as an on-line commerce application and system, such as a brokerage application, that allows users to access portfolio information, stock quotes, and to execute stock transactions. First, a user of either telephone 12 or client 24 will access system 10 by logging on. System 10, as part of its security functions will perform a logon process. The logon process is described in more detail below and is illustrated more fully in FIG. 5. Generally though, a user of a client of system 10 will receive a logon menu and will provide an account number and password and will select a logon button. The account number may be a user id or a logon id. In response, the password and account number will be provided to database server 22. Database server 22 will, in response, execute a logon stored procedure that verifies the user's account number and password. The account number and password are encrypted before being transmitted through a network, such as the Internet, employing any available encryption technique such as the Secure Socket Layer (SSL) specification that is used between web browsers and web servers. If the verification is successful, database server 22 generates a unique session identification number (session id) and stores it locally in a user table such that it is associated with the user's account number. The session id is encrypted before being stored to further secure the session. Database server 22 then provides the session id and account number back to the client where it is stored. In the case of telephone 12, the session id and account number may be stored at IVR system 16 where storage capability is available. A main menu is then provided to the client.

The user of system 10 may then desire to check, for example, portfolio information that is stored on some disparate data source. The portfolio information may be provided on a remote data source such as data source 36 of FIG. 1. In response to requesting access to portfolio information, the client also provides the session id and account number back to database server 22 where it is once again verified. This process is referred to as the check access process and is described more fully below and is illustrated in FIG. 6. Generally though, database server 22 will verify the session id, check to ensure that the client has not waited too long between requests, and will log all requests made by the user in an activity log table. The check access process will also check to ensure that the user has privileges or rights to perform the requested function. If so, the portfolio data is retrieved from the disparate data source 36 using a stored procedure and a registered procedure of database server 22 and the information is provided back to the user in any of a variety of formats, such as web page, an e-mail, or as a voice message. The stored procedure or computer program of database server 22 serves as an application program interface to exchange information with either IVR system 16 or web server 28. Web server 28 may also be referred to as a network server. It should be noted that the application program interface or stored procedure is the same regardless of whether the request was made from IVR system 16 or from web server 28.

In one embodiment, data source 36 is provided on a platform that is completely different from that of database server 22 and hence includes an interface program that allows data source 36 to retrieve the request from database server 22, to process the request, and to provide the appropriate data back to database server 22. In such a case, database server 22 will generally also execute a registered procedure which is called by the stored procedure and includes interfacing instructions or code compatible with data source 36.

Finally, a user of telephone 12 or client 24 may end a session by initiating a log out process. The log out process is described in more detail below and is illustrated more fully in FIG. 7. Generally though, a user of a client may initiate the log out process by selecting a log out button. This results in the session id, account number, and log out request being provided from the client to database server 22. Database server 22 responds by executing a log out stored procedure using the database management system. Once again, the session id is verified and if found to be valid, the session id is erased from the user table of database server 22. An activity log is updated reflecting the time that the user logged out and a command is sent to the client to delete the unique session id and account number previously stored at the client. The session id and account number were stored in IVR system 16 when client access is provided through a telephone coupled to IVR system 16. Hence, the command to delete the unique session id and account number is sent to IVR system 16 in such a case. Finally, database server 22 presents a home page menu or voice command to the user at the client so that the user may either exit system 10 entirely or attempt to logon again.

Thus, system 10 provides a unique system architecture for easily developing and implementing on-line computer applications and systems, such as on-line commerce type applications, that access disparate data sources. The stored procedures or APIs of database server 22 allow for system development of the presentation layer to proceed independently from the development of the application layer and the data layer thus reducing overall system development time and costs. System 10 also provides session management and security features allowing users to feel confident that their account information is secure and allowing information providers to feel confident that their data sources are secure. The fact that database server 22 is provided separately increases overall system security and ensures that a user table of all account information is provided in only one location. As mentioned above, the security functions of system 10 may be generally divided into a logon process; a check access process; and a log off process. Each of these security functions are described in more detail below and in the various FIGUREs.

Figure 2:
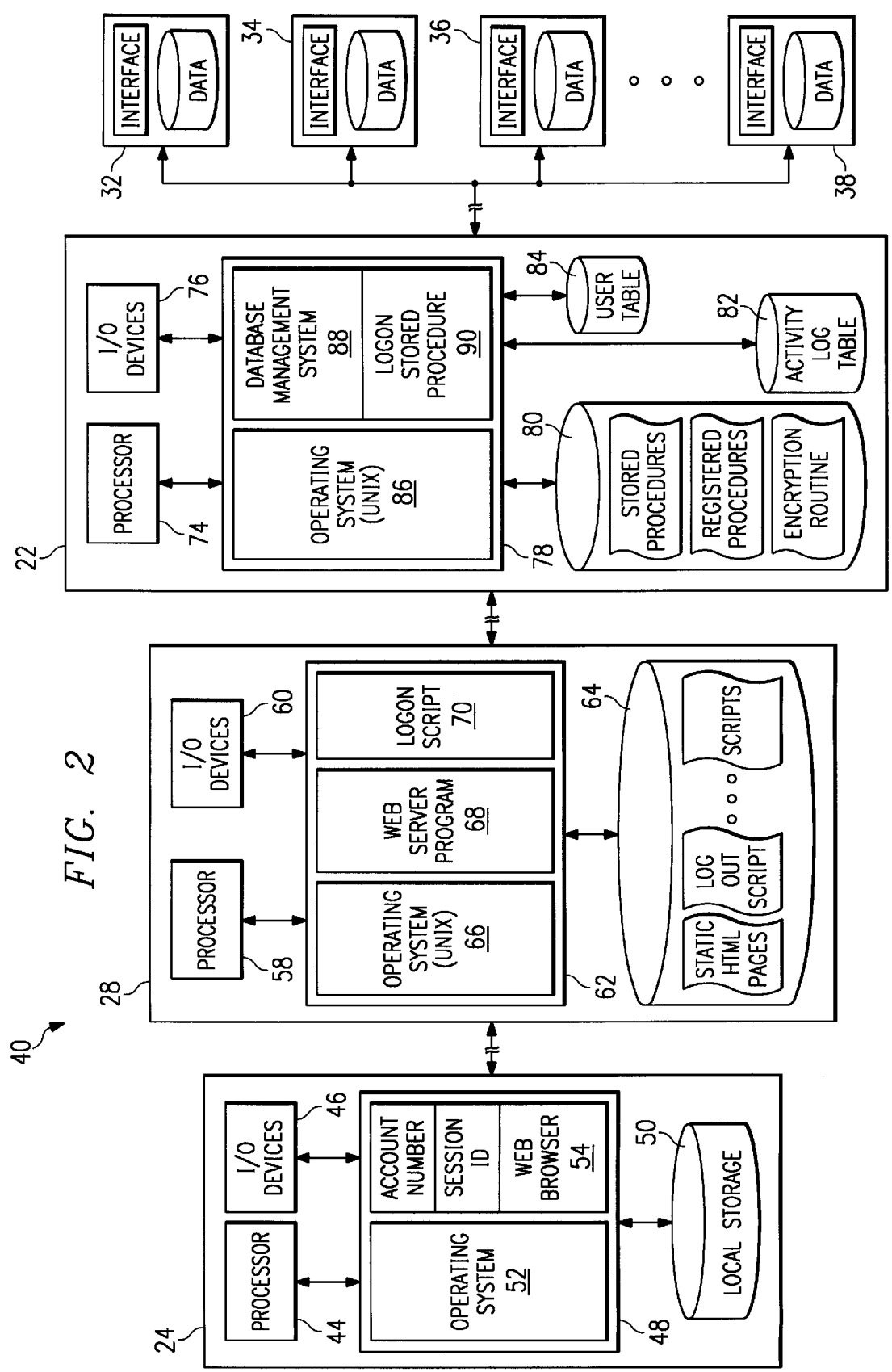
FIG. 2 is a block diagram illustrating an exemplary connection between a client, a web server, a database server, and a plurality of disparate data sources according to the teachings of the present invention.

FIG. 2 is a block diagram illustrating an exemplary connection 40 between client 24, web server 28, database server 22, and a plurality of disparate data sources according to the teachings of the present invention. The disparate data sources may be provided as data source 32, data source 34, data source 36, and data source 38 as discussed previously in relation to FIG. 1.

Client 24 includes a processor 44, I/O devices 46, memory 48, and local storage 50. Memory 48 is shown enabled or loaded with an operating system 52 and a web browser 54. Web browser 54 also includes memory storage locations, such as Cookies, that are used in the present invention to store the account number and session id in volatile memory such as memory 48. Memory 48 may be implemented as any type of memory but will preferably be implemented as RAM. Client 24 may be implemented on virtually any computer such as a personal computer, a minicomputer, a work station, using a local area network (LAN), or any other computer capable of executing web browser 54.

Processor 44, under the control of operating system 52, is used to retrieve, process, store, and display data. Processor 44 communicates control, address, and data signals with operating system 52 and with the remaining components of client 24 through a system bus. Processor 44 may include an arithmetic logic unit used to assist processor 44 in performing mathematical operations. Processor 44 interprets and executes instructions that have been fetched or retrieved from memory 48, such as from web browser 54, and may be implemented as a single integrated circuit or as a combination of integrated circuits. Processor 44 may be implemented using virtually any available processor such as an INTEL or MOTOROLA microprocessor. Similarly, I/O devices 46 may be any peripheral that allows data to be exchanged or accessed with client 24 and may include such devices as a keyboard, pointing device, a monitor, a graphics tablet, a modem, and the like. Local storage 50 may be any device capable of storing computer files such as a hard disk drive, a read/write compact disk, and the like. Operating system 52 may be provided as any available operating system such as WINDOWS, WINDOWS 95, WINDOWS NT, OS/2, MS-DOS, and UNIX.

Web browser 54, along with operating system 52 may be provided to memory 48 from local storage 50 either when selected by a user or automatically during initialization of client 24. Web browser 54 allows information to be exchanged with servers of the Internet or servers of a corporate intranet. Web browser 54 will preferably be provided as a graphical web browser that may be classified as a parser program that allows the user to view images, fonts, and document layouts provided in a web page by converting large units of data into smaller, more easily interpreted, units of data. Preferably, web browser 54 reads the tagged text of a web page provided in HTML format. HTML uses tags to identify the parts of a web page, such as headings, bulleted lists, body text, onscreen forms, including fill-in text boxes, option buttons, radio buttons, and drop-down list boxes, images to be displayed, hypertext links, colors, fonts, and various other formatting tags. Web browser 54 formats the various parts of the document for on-screen display as directed by the HTML tags.

Web browser 54 will also be provided as a forms-capable browser and a script-enabled browser which allows it to interpret HTML formatted web pages that include embedded script, such as JAVASCRIPT, within the HTML code. The embedded script is provided to web browser 54 for enhanced processing to ensure that only valid entries are provided within select forms and that all appropriate forms are entered in certain input web pages. Web browser 54 preferably will be implemented using NETSCAPE NAVIGATOR or MICROSOFT EXPLORER.

As previously discussed, web server 28 couples to client 24 through any available communications link. Also, firewall 20 of FIG. 1 may be provided but is not illustrated in FIG. 2. Web server 28 includes a processor 58, I/O devices 60, memory 62, and mass storage device 64. Memory 62 is shown enabled or configured with an operating system 66 which will preferably be provided as the UNIX operating system, a web server program 68 which will preferably be provided as the NETSCAPE ENTERPRISE SERVER, and a logon script 70 that may be written using Practical Extraction and Report Language (PERL) which is widely used to write CGI scripts for WWW forms processing. Once again, the CGI is a standard that describes how HTTPD compatible WWW servers should access external programs so that data is returned to the user in the form of an automatically generated web page.

It should also be noted that additional Internet servers or corporate intranet servers will likely be positioned between client 24 and web server 28. As such data security is of paramount importance. One method of ensuring that data is not improperly intercepted through this path is to provide encryption between client 24 and web server 28. This may be accomplished using secure HTTP or Secure Sockets Layer (SSL) protocol when exchanging data. SSL is application independent and works with all Internet tools, not just the WWW. Applications that use SSL use public key encryption to ensure that while information is being conveyed through the Internet, no one can intercept that information.

Web server 28 may be implemented on virtually any computer such as a personal computer, a minicomputer, a work station, a LAN, a mainframe computer, or any other computer capable of executing a web server program and interfacing with other servers. Preferably, web server 28 is implemented as a SUN workstation using the UNIX operating system.

Processor 58, just like processor 44 of client 24, is under the control of the local operating system, which in this case is operating system 66. Processor 58 is used to retrieve, process, store, and display data. Processor 58 communicates control, address, and data signals with operating system 66 and with the remaining components of web server 28 through a system bus. Processor 58 may include an arithmetic logic unit used to assist in performing mathematical operations. Processor 58 interprets and executes instructions that have been fetched or retrieved from memory 62, such as from web server program 68 and logon script 70, and may be implemented as a single integrated circuity or as a combination of integrated circuits. Similarly, I/O devices 60 may be provided as any I/O device such as those listed previously with respect to I/O devices 46. Mass storage device 64 may be any device capable of storing computer files and is shown with various computer files stored within. For example, static HTML pages are shown that represent web pages having individual URL addresses. Also, various other scripts are shown within mass storage device 64. For example, a log out script is shown and will be used in web server 28 when a user request to log out of system 10.

Web server 28 may provide information to any number of clients desiring such information. Normally, clients submit a URL corresponding to a static HTML page or a URL corresponding to a particular script that is to be executed. Web server 28 also interfaces with data server 22 through any available communications link. This communications link may be a secure link to further increase over all system security. The various scripts of web server 28 may call various stored procedures provided within database server 22. For example, the scripts provided at web server 28 may include web extension commands or statements that allow a script to directly call various stored procedures of database server 22.

The stored procedures may be thought of as application program interfaces that perform various functions. It should also be noted that web server 28 and database server 22, due to their critical importance to system 10, may be provided as redundant systems. Thus, a primary web browser 28 may be provided along with a back-up web browser 28. Similarly, a primary database server 22 may be provided along with a back-up database server 22. This provides several advantages, one of which is to minimize overall system outages created by system failures. Also, the back-up systems may be used to serve as a development system for upgrading and maintaining the various software routines of system 10.

Database server 22 includes a processor 74, I/O devices 76, memory 78, and various mass storage devices or tables such as mass storage device 80, activity log table 82, and user table 84. Memory 78 will generally be provided as RAM and will be enabled with operating system 86, which will preferably be provided as the UNIX operating system, and a database management system 88, which will preferably be provided as SYBASE relational database management system. In such a system, database management system 88 may receive instructions or commands from scripts located at web server 28 to initiate various stored procedures or computer programs located within database server 22. For example, a logon stored procedure 90 is shown being executed by database management system 88. Logon script 70 of web server 28 may initiate the execution of logon stored procedure 90.

Mass storage device 80 is provided to store a variety of computer files and programs such as various stored procedures, an encryption routine, and various registered procedures. Once again, stored procedures may be defined as programs that allow a directly compatible data source, such as a SYBASE compatible database or application, to perform functions as desired. A registered procedure will generally be called by a stored procedure and is used to pass parameters and values to a database or application that is not directly compatible with database management system 88. Registered procedures may be written in C code, and along with the stored procedures, allow for portability and ease of upgradeability when designing new systems.

Activity log table 82 is used by database server 22 to log various events such as the date and time of a user logon, the date and time of a user log off, and all of the individual requests made by a user during a session, including both authorized and unauthorized requests. User table 84 serves as part of the security system of system 10 and includes all of the user information such as account numbers, passwords, which are normally encrypted by the encryption routine shown within mass storage device 80, sessions ids generated during a user's session, and user permissions or rights. The fact that user table 84 is provided in one location further enhances overall security because of the limited distribution of user data and the fact that critical information such as passwords and session id numbers may be encrypted when stored in user table 84. Also, the fact that user table 84 is provided in only one location eases the administrative burden when a user changes a password or when a user must be added or deleted from the system.

It should also be noted that although connection 40 illustrates only one connection to database server 22, it should be understood that database server 22 is a multi-tasking machine that may provide multiple sessions with multiple users and clients. The fact that database server 22 is separate from the Internet and is provided in such a manner that it is not generally accessible as an Internet server or corporate intranet server further enhances the security of system 10. Database server 22 may also provide multi-session and multi-threading such that multiple threads may run at the same time. In this manner, operating system 86 may determine which thread gets the highest priority for processing.

As illustrated in FIG. 1, database server 22 provides access to the various data sources. These data sources may be either directly compatible with database management system 88 of database server 22 or provided on a different platform or environment that is not directly compatible with database management system 88. In such a case, these data sources may be referred as disparate data sources. The disparate data sources may be accessed using a registered procedure that is called by a stored procedure by database management system 88. Data source 32, data source 34, data source 36, data source 38 will generally all include an interface to exchange information and so that an appropriate data function may be carried out. Additionally, it should be understood that the various data sources may not only be implemented as databases but may also include application programs, and any other system capable of receiving an input and generating an output. The output of the data source is then provided to database server 22.

In operation, the client logs onto database server 22 by selecting an appropriate web page from web server 28. The user then enters an account number and password which is encrypted and is sent to database server 22 through web server 28. As a result, logon script 70 is loaded by web server program 68. Next, database server 22 generates a corresponding session id which is provided back to web browser 54 of client 24 along with the account number. The account number and session id are stored in volatile memory at client 24 and will not be written to local storage 50. This further enhances security by not allowing a later user of client 24 to examine files that may reveal confidential account information. Once a logon has been established, a main menu is provided to client 24 so that the user may select a desired function. After selecting a desired function, the request and information are provided to web server 28 where a corresponding script is loaded by web server program 68. In response, database server 22 is contacted and a corresponding stored procedure is executed. In some situations, a registered procedure may also be executed by database management system 88. Next, data is accessed and exchanged with an appropriate data source using the stored procedure and sometimes a registered procedure. The information received from the data source is then provided back to database server 22 where it is provided back to the calling script where the information is then formatted and a web page is provided back to web browser 54 of client 24. The user may then view the data and execute any additional functions as desired. Also, each time a request is made, database server 22 receives a session id from client 24 and verifies that the session id and account number are correct. This is detailed more fully below. All of this activity is logged in activity log table 82 as various requests are made by a user of client 24.

Figure 3:
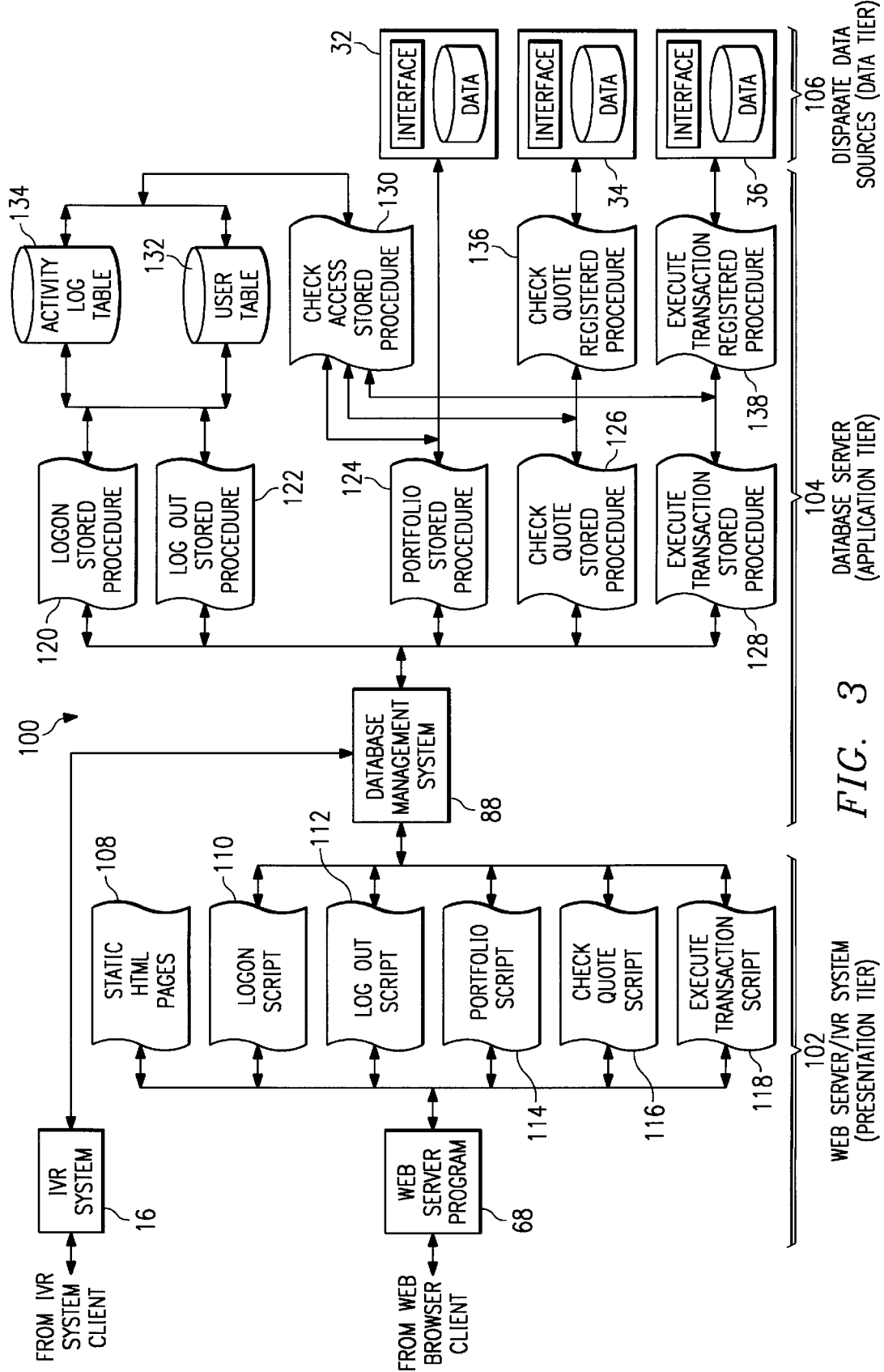
FIG. 3 is a block diagram illustrating an exemplary implementation of the present invention showing a set of routines used to access the plurality of disparate data sources and to function as a brokerage application that allows users to access portfolio information, to retrieve stock quotes, and to execute stock transactions.

FIG. 3 is a block diagram illustrating an exemplary implementation 100 of the present invention showing a set of routines used to access the plurality of disparate data sources so as to function as a brokerage application that allows a user to access portfolio information, to retrieve stock quotes, and to execute stock transactions. Implementation 100 may be accessed using a client coupled to either IVR system 16 or web browser program 68. IVR system 16 couples directly to database management system 88 and serves as part of the presentation tier and may be used to directly call any of the stored procedures listed directly to the right side of database management system 88.

Web server program 68 also serves as part of the presentation tier or layer that is provided between a web enabled client and database management system 88. Web server program 68 may access any of a variety of scripts and may also provide static HTML pages back to a requesting client coupled to web server program 68. For example, web server program 68 may access static HTML pages 108, a logon script 110, a log out script 112, a portfolio script 114, a check quote script 116, and an execute transaction script 118. Web server program 68 executes the appropriate script or provides the appropriate HTML page as requested by a user at a web browser-enabled client.

For example, when a user initially logs on, web server program 68 initiates logon script 110 which prompts the user to enter an account number and a password. Once this information is received at web server program 68, logon script 110 accesses database management system 88 and provides the corresponding account number and password. Logon script 110 instructs database management system 88 to execute a logon stored procedure 120 to assist with the logon process. Logon stored procedure 120, under the control of database management system 88, accesses a user table 132 and verifies the provided account number and password. Also, log on stored procedure 120 accesses an activity log table 134 and generates a record reflecting the logon event. If the account number and password are verified, control returns to logon script 110. Logon script 110 may then generate a main menu of the brokerage application and provide it to the client as a web page.

In response, a user may then select from the main menu which may allow a user to retrieve portfolio information, to check a quote, or to execute a transaction. Depending on what the user selects, web server program 68 initiates the appropriate script. For example, portfolio script 114 is executed when the user desires to receive portfolio information and the check quote script 116 is initiated by web server program 68 when the user desires to check a quote. Each of the scripts will generally be assigned a unique URL so that the client may request the appropriate script by selecting a hypertext link or button at the main menu. Finally, if the user desires to execute a transaction, the execute transaction script 118 will be activated. When the user desires to log out, log out script 112 will be initiated by web server program 68.

Each of the scripts will generally be associated with a corresponding stored procedure of the database server. Similarly, each stored procedure or registered procedure of the database server will be associated with a corresponding data source. For example, portfolio script 114 corresponds to a portfolio stored procedure 124 which is then associated with a data source 32. Also, a check quote script 116 is associated with a check quote stored procedure 126 which is also associated with a check quote registered procedure 136 and a corresponding data source 34. Finally, execute transaction script 118 is associated with an execute transaction stored procedure 128 which corresponds to data source 36 through an execute transaction registered procedure 138. It should be noted that registered procedures are provided when the corresponding data source is not directly compatible with database management system 88. However, as far as the scripts and systems of the presentation tier are concerned, each of these always interface with a stored procedure in the same manner without the need to know any of the peculiarities of an associated registered procedure and disparate data source.

When a user selects a desired function, database management system 88 will initiate the corresponding stored procedure. For example, when a user desires to check a particular stock quote, database management system 88 will initiate check quote stored procedure 126. Before actually attempting to access the associated data source, check quotes stored procedure 126 will execute a check access stored procedure 130. The check access stored procedure is a security function that is illustrated more fully below in connection with the description of FIG. 6. Generally though, check access stored procedure 130 will receive the session id and account number that was provided when the user requested the current function. This information will be compared to the session id and account number that are stored within user table 132 for verification. This event will then generate a record within activity log table 134 to provide a record of the event. Assuming that access is allowed, control returns to check quotes stored procedure 126 where check quote registered procedure 136 is then executed.

Check quote registered procedure 136 serves as an application program interface between the information requested and provided by the user and data source 34. Data source 34 will generally include an interface and will perform the requested function and provide any output data back to check quote registered procedure 136. This information is then provided to check quote stored procedure 126 and back to either IVR system 16, if the client is coupled to IVR system 16, or to check quote script 116 of web server program 68 if a user is coupled to the system via a web-enabled client. In response, a corresponding output will be provided to the user and will provide the latest quote of the requested stock.

The operation of portfolio stored procedure 124 proceeds as just described with respect to check quote stored procedure 126 except that portfolio stored procedure 124 accesses the corresponding data source 132 directly. In this case, data source 32 is directly compatible with database management system 88 and hence access may be directly obtained using only stored procedures.

Finally, execute transaction stored procedure 128 and execute transaction registered procedure 138 proceeds identically with that described in connection with check quote stored procedure 126. The corresponding data source 36 provides the transaction information and capability desired.

Overall, implementation 100 may be divided into three separate layers or tiers. The first tier may be referred to as a presentation tier 102 and includes the web server and IVR system. The next tier may be referred to as an application tier 104 and includes the database server and associated database management system, procedures, routines, and tables. Finally, the last tier includes a data tier 106 and includes all of the data sources used in the current system. These data sources will include disparate data sources.

Figure 4:
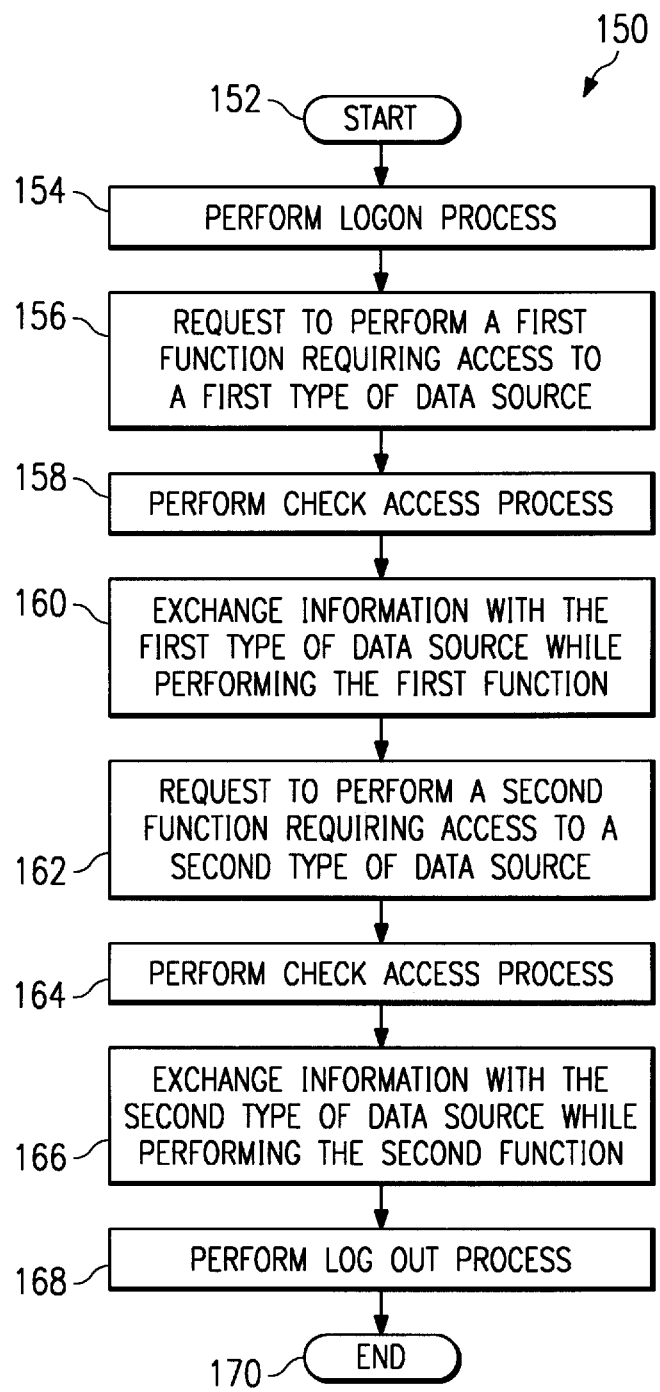
FIG. 4 is an overview flowchart illustrating an exemplary method for securely accessing information from disparate data sources through a network according to the teachings of the present invention.

FIG. 4 is an overview flow chart illustrating an exemplary method 150 for securely accessing information from disparate data sources through a network according to the teachings of the present invention. The method begins at step 152 and proceeds to step 154 where a logon process is performed. The logon process, along with a check access process, and a log out process provide additional security features of the present invention. A more detailed discussion of the logon process is provided later and is illustrated more fully in FIG. 5. Generally, the logon process involves verifying a user's account number and password and generating a unique session id in response. The unique session id is encrypted so that personnel at database server 22 will not have access to a user's session id. Also, the logon process involves generating a record in an activity log table at the database server to record the logon process.

Method 150 proceeds next to step 156 where a user at a client requests to perform a first function. The first function requires access to a first type of disparate data source. The method proceeds next to step 158 where the check access process is performed to provide session management and to provide additional security features. The check access process is described more fully below in connection with FIG. 6. Generally, the check access process involves receiving the session id and account number, that was previously stored at the client in step 154, along with the function requested by the user. This information is ultimately provided as an input to database server 22 where the session id and account number are verified against a user table to ensure that they are valid. Next, the user table is checked to determine if the user has permission to perform the requested first function and whether the user has taken too much time between this request and a prior request. Also, a record is entered in an activity log reflecting the user's request. Finally, if everything checks out the first function is performed.

Method 150 then proceeds to step 160 where information is exchanged between database server 22 and the first type of disparate data source related to performing the first function requested. In this case, because access is needed to a disparate data source, the database management system, such as database management system 88 of database server 22, will use a stored procedure to call a registered procedure to access the first type of disparate data source. Once again, the registered procedure may be an application program interface developed using C code allowing for an exchange of data between the first type of disparate data source and the database management system of database server 22. After the information is retrieved, the information is ultimately provided back to the client. In the case of a web browser-enabled client, the information will be provided by a web server in the form of a web page.

Next, the method proceeds to step 162 where the user requests to perform a second function requiring access to a second type of data source. The second type of data source may be a data source that is compatible with the database manager resident within database server 22. In such a case, the database management system will use a stored procedure to access the second type of data source.

The method proceeds next to step 164 where the check access process is performed once again. This is performed in the same manner as was discussed previously with respect to step 158. Assuming the check access process does not find any problems, the method proceeds next to step 166 where the stored procedure of database server 22 is performed to exchange information with the second type of data source to perform the second function as requested by the user.

Finally, the method proceeds to step 168 where a log out process is performed to provide yet another security function. The log out process is described more fully below in connection with the description accompanying FIG. 7. Generally, the log out process involves the user selecting a log out button and providing the session id, account number, and log out function request to database server 22. The session id is again validated and records are generated in the activity log table of database server 22. Next, the session id is erased from the user table and a command is sent to the client to delete the session id and account number previously stored at the client during the logon process for this session. For example, if client 24 of FIG. 1 is used, the session id and account number were originally stored in the memory or Cookie of the web browser-enabled client 24. If telephone 12 of FIG. 1 is used as a client, the session id and account number are stored at IVR system 16 and thus are deleted during the log out process from IVR system 16. Finally, the user will receive a home page or home menu allowing the user to logon again if desired. Method 150 ends at step 170.

FIG. 5 is a flow chart illustrating an exemplary method 172 for performing a logon process that may be used in method 150 for securely accessing information from disparate data sources. Method 172 begins at step 174 and proceeds to step 176 where a user enters an account number and a password at a client and selects a logon button. In response, method 172 proceeds to step 178 where the account number and password are received from the client at either a network server, such as web server 28 of FIG. 1, or at another system such IVR system 16 of FIG. 1.

Method 172 then proceeds to step 180 where a logon stored procedure is executed at database server 22 while the account number and password are also provided to database server 22. Proceeding next to decision step 200, the account number and password are verified against a user table provided at database server 22 to determine if they are valid. If not, the method proceeds to step 202 where a failed logon variable associated with the account number is incremented by one. The method then proceeds to decision step 204 where if the failed logon variable is equal to three, the method proceeds to steps 208 and 210 where the user's account number is disabled in the user table and an error message is generated and presented to the client. The method then ends at step 220. Otherwise, the method proceeds to step 206 where an error message is provided to the client that an invalid account number or password had been received and that the logon was not successful. As such, the method proceeds back to step 178 and proceeds again to decision step 200.

If the account number and password are found to be valid in decision step 200, the method proceeds to step 212 where a unique session id is generated and stored in the user table. In a preferred embodiment, the unique session id also contains information corresponding the current time and date and is then stored in the user table where it may be associated with the account number. The unique session id is scrambled or encrypted so that system administrators and other personnel having access to database server 22 may never access the session id.

Method 172 proceeds next to step 214 where a record is generated in an activity log table provided through database server 22. Next, the session id, which may be encrypted, and an account number are provided back to the client for storage in step 216. For example, if the client is a computer enabled with a web browser, such as client 24 in FIG. 1, the session id and account number are stored in volatile memory such as random-access memory (RAM) of the client by the web browser. On the other hand, if the client is similar to telephone 12 of FIG. 1 and does not provide the capability to store information, the session id and account number may be stored at a termination device such as IVR system 16 of FIG. 1. Finally, a main menu is presented at the client for the user and the method ends at step 220.

FIG. 6 is a flow chart illustrating an exemplary method 230 for performing the check assess process that may be used in method 150 for securely accessing information from disparate data sources and for performing session management. Method 230 begins at step 232 and proceeds to step 234 where the user selects a desired function to execute. As a result, the session id, account number, and the function request are provided to database server 22 from the client. As was mentioned previously with respect to telephone 12 of FIG. 1, when the client is incapable of storing information, an associated system, such as IVR system 16, may be used to send and receive this information.

Method 230 proceeds next to step 236 where the input information is received at database server 22. Database server 22 compares the received session id with the session id stored in the user table associated with the user's account number. Proceeding next to the decision step 238, if the session id is verified, the method proceeds to step 242; otherwise, the method proceeds to step 240 where a record is generated in the activity log table and an error message is generated that requires the user to logon again. The method then ends at step 264.

Assuming that the session id was found to be valid, decision step 238 proceeds to step 242 where the function requested by the user in the input is compared with the user permissions or rights, that, preferably, will be stored in the user table, to determine if the user has sufficient privileges or rights to execute the requested function. Also, step 242 involves comparing the current time to the last time that the user made a request during the current session. If this time is greater than a predefined period, such as fifteen minutes, an error message is provided to the client and the client is required to reenter the correct password. This is illustrated more fully in the following steps.

Method 230 proceeds next to decision step 244 where it is determined whether too much time has expired between requests. If so, the method proceeds to step 246 where a record is generated in the activity log table at database server 22 and an error message is generated and provided back to the client requesting the user to reenter the correct password. The method then ends at step 264. If too much time has not expired between requests, the session continues and decision step 244 proceeds to decision step 248 where it is determined whether the user has the appropriate permission to perform the function requested. If not, the method proceeds to step 250 where a record is generated in the activity log table indicating that the user attempted to execute a function to which the user did not have appropriate permission. Also, an error message is generated and provided back to the client. Method 230 then ends at step 264.

If the user does have the appropriate permission to perform the function requested, decision step 248 proceeds to step 260 where control is provided to the calling stored procedure as illustrated previously in FIG. 3. Next, the method proceeds to step 262 where the activity log table is updated by generating a new record that includes the information corresponding to the function requested, the account number, the date, and the time. Method 230 ends at step 264.

FIG. 7 is a flow chart illustrating an exemplary method 280 for performing a log out process that may be used in method 150 for securely accessing information from disparate data sources. Method 280 begins at step 282 and proceeds to step 284 where the user selects a log out button. The method then proceeds to step 286 where the session id, account number, and log out function request is received as an input from the client.

Method 280 proceeds next to step 288 where a log out stored procedure is executed at database server 22. The log out stored procedure compares the received session id input with the session id previously stored in the user table. If the session id is found to be valid, a decision step 290 proceeds to step 296. Otherwise, the method proceeds to step 292 where the activity log is updated with a new record reflecting the unsuccessful log out attempt. An error message is then generated in step 294 and presented to the client. The method will then end at step 304.

Assuming that the session id was found to be valid, the method proceeds to step 296 where the session id is erased or removed from the user table. This indicates that the session has ended and that any further transactions or requests cannot proceed until the user has logged on again. Proceeding next to step 298, the activity log table is updated with a record reflecting the time and date of the log out. Next, the method proceeds to step 300 where a command or input is sent to the client to delete the session id and account number previously stored at the client during logon. For example, assuming that the client is a web browser-enabled computer such as client 24 of FIG. 1, a command is sent to the volatile memory controlled by the web browser, such as a Cookie, to erase the encrypted session id and account number that were previously stored. This prevents any record of the session id and account number from later being written to a file, such as the Cookie file of a web browser. Hence, no record of the session id or account number exists at the client.

Method 280 proceeds next to step 302 where a home page or greeting page or menu is provided to the client where the user has the option of logging on the system if desired. The method ends at step 304.

Figure 8:
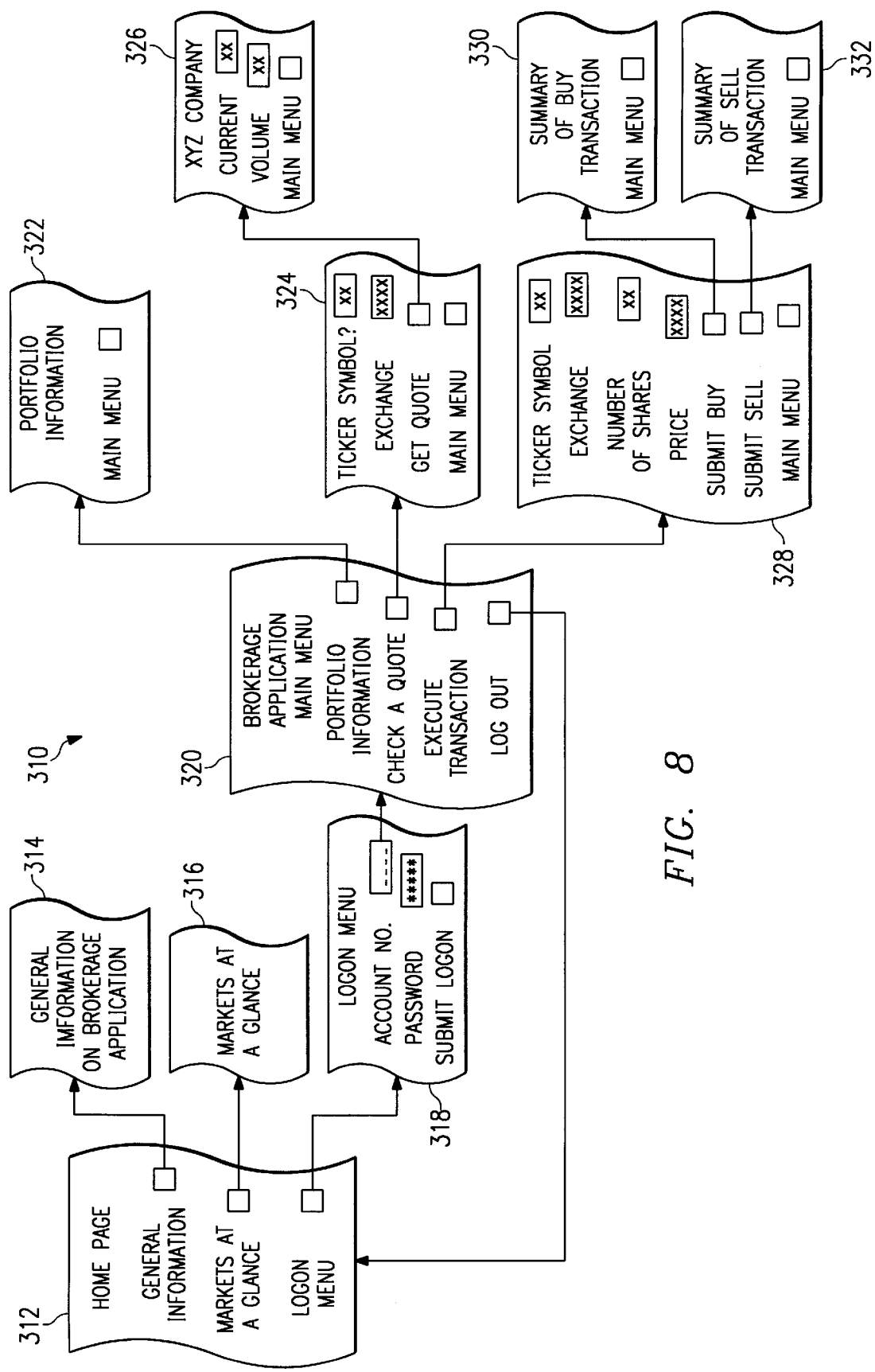
FIG. 8 is an overview exemplary map of various input/ informational displays and output displays that may be used in the brokerage application of FIG. 3.

FIG. 8 is an overview exemplary map 310 of various input/informational displays and output displays that may be used in the brokerage application of FIG. 3. As such, a home page, greeting page, or menu may be provided as illustrated by home page 312. Home page 312 allows the user to select one of three buttons: (1) to view general information on the brokerage application; (2) to view markets at a glance to see a summary of overall market information; and (3) to logon the system by accessing a logon menu.

A general information display 314 is provided if the general information button is selected. General information display 314 provides general information on the brokerage application and discusses such things as how to apply for an account number and the overall and general features provided by the brokerage application or system. If the markets at a glance button is selected, markets at a glance display 316 is provided. This display provides information on the major exchanges and stock markets of the world and whether they are up or down for the current day or previous day.

Assuming that the user selects the logon menu button at home page 312, the system displays a logon menu 318 as illustrated in map 310. Logon menu 318 prompts the user to enter an account number, and a password. After entering the account number and password, the user may select a submit logon button so that this information is provided to the system.

Assuming that the submit logon button was selected, a brokerage application main menu 320 is provided to the user at the client. This may be provided in the form of a voice menu for an IVR system or as a web page when the client is a web browser-enabled computer. Brokerage application main menu 320 includes various buttons to allow a user to select desired functions. For example, brokerage application main menu 320 may provide a portfolio information button, a check a quote button, an execute transaction button, and a log out button. If the log out button is selected, the client will be taken back to home page 312.

Assuming that the portfolio information button is selected, the user's portfolio is gathered from an appropriate data source, such as a disparate data source, and an appropriate output display is generated. For example, a portfolio information output display 322 may be generated that summarizes the user's current portfolio. After viewing portfolio information output display 322, the user may select a main menu button to return to brokerage application main menu 320.

Assuming that the check a quote button is selected, a quote input display 324 is provided to the client. Quote input display 324 prompts the user to enter a desired ticker symbol and exchange. Quote input display 324 then allows the user to select a get quote button or a main menu button. Assuming that the get quote button is selected, a quote output display 326 is generated and provided to the client. Quote output display 326, in one embodiment, may display the current or last stock price and the volume of the stock traded during the current day or during the last day that the market or exchange was open. The user may then proceed back to brokerage application main menu 320 by selecting the main menu button on quote output display 326.

Next, assuming that a user selected the execute transaction button from brokerage application main menu 320, the brokerage application generates a transaction input display 328. Transaction input display 328 may include, in one embodiment, an entry field for the ticker symbol, the exchange where the stock or security is traded, the number of shares desired in the current transaction, and a price at which the user will buy or sell the desired stock. Transaction input display 328 may then include a submit buy button and a submit sell button so that the user may either buy or sell the desired stock according to the entered terms. Alternatively, the user may exit transaction input display 328 by selecting the main menu button and proceeding back to brokerage application main menu 320.

Assuming that the user selected the submit buy button, a transaction buy summary output display 330 will be generated summarizing the buy transaction. Alternatively, if the submit sell button of transaction input display 328 is selected, the brokerage application, in one embodiment, may generate a transaction summary sell output display 332. This display provides a summary of the sell transaction and provides a button to return to brokerage application main menu 320.

Referring back to brokerage application main menu 320, the log out button may be selected which will perform the log out process and generate a display such as home page 312 where a user may logon to the system again if desired.

Thus, it is apparent that there has been provided, in accordance with the present invention, a system and method for securely accessing information from disparate data sources through a network that satisfy the advantages set forth above. Although the preferred embodiment has been described in detail, it should be understood that various changes, substitutions, and alterations can be made herein without departing from the scope of the present invention. For example, although the present invention has been described and illustrated primarily in relation to developing Internet or Web applications, it should be understood that the present invention is in no way limited to only the Internet and may be implemented on other computer networks as well. Also, the security modules and routines described and illustrated in the preferred embodiment as discrete or separate modules and routines may be implemented using a single routine or a plurality of individual modules or routines without departing from the scope of the present invention. Furthermore, it should be noted that the present invention may be implemented using virtually any computer system and many of the software routines may be developed using virtually any available programming language. Other examples of changes, substitutions, and alterations are readily ascertainable by one skilled in the art and could be made without departing from the spirit and scope of the present invention as defined by the following claims.

What is claimed is:

1. A method for securely accessing information from disparate data sources through a network comprising the steps of:

requesting a logon menu from a network server of the network using a client;

receiving a logon menu at the client;

communicating a logon input to the network server in response to receiving the logon menu;

receiving the logon input at the network server and communicating the logon input to a database server;

verifying that the logon input is a valid logon input at the database server;

generating and storing a unique session identification number at the database server in response to successfully verifying that the logon input is a valid logon input;

communicating the session identification number and a portion of the logon input to the client;

storing the session identification number and the portion of the logon input at the client;

communicating a menu to the client prompting the user to perform at least a first function requiring access to a first type of disparate data source and a second function requiring access to a second type of data source;

requesting the first function;

communicating the session identification number, the portion of the logon input, and the first function request to the network server;

receiving the session identification number, the portion of the logon input, and the first function request at the network server and communicating to the database server;

verifying at the database server that the session identification number and the portion of the logon input are valid;

exchanging information between the database server and the first type of disparate data source while performing the first function; and generating a first output in response to performing the first function and communicating this to the client.

2. The method of claim 1, further comprising the steps of:

requesting the second function;

communicating the session identification number, the portion of the logon input, and the second function request to the network server;

receiving the session identification number, the portion of the logon input, and the second function request at the network server and communicating this information to the database server;

verifying at the database server that the session identification number and the portion of the logon input are valid;

exchanging information between the database server and the second type of data source while performing the second function; and generating a second output in response to performing the second function and communicating this to the client.

3. The method of claim 2, wherein the logon input includes a password and an account number, and the portion of the logon input includes the account number.

4. The method of claim 1, further comprising the steps of:

communicating a log off request, the session identification number, and the portion of the logon input to the network server from the client;

communicating the log off request, the session identification number, and the portion of the logon input from the network server to the database server;

verifying at the database server that the session identification number and the portion of the logon input are valid;

deleting the session identification number at the database server;

sending a command to the client to delete the stored session identification number and the portion of the logon input at the client.

5. The method of claim 4, wherein the client is a computer enabled with a web browser and the storing the session identification number and the portion of the logon input at the client step includes using the web browser to store the session identification number and the portion of the logon input in a portion of volatile memory, and wherein the sending a command to the client to delete the stored session identification number and the portion of the logon input step includes deleting the contents of the portion of volatile memory before the web browser writes the session identification number and the logon input to non-volatile memory.

6. The method of claim 1, wherein the client is a computer enabled with a web browser and the storing the session identification number and the portion of the logon input at the client step includes using the web browser to store the session identification number and the portion of the logon input in volatile memory.

7. The method of claim 1, wherein the database server is in continuous, direct communication with the network server and is not directly accessible through the network.

8. The method of claim 1, wherein the exchanging information between the database server and the first type of disparate data source while performing the first function step includes using a database management system, a stored procedure, and a registered procedure at the database server to access the first type of disparate data source which is not directly compatible with the database management system.

9. The method of claim 1, wherein the exchanging information between the database server and the second type of data source while performing the first function step includes using a database management system at the database server to access the second type of data source that is directly compatible with the database management system.

10. The method of claim 1, wherein a record in an activity logging table at the database server is generated after the requesting the first function step.

11. The method of claim 1, wherein the communication between the client and the network server is provided using a secure socket layer standard.

12. The method of claim 1, wherein the verifying that the logon input is a valid logon input at the database server step includes encrypting a password provided as part of the logon input and comparing the encrypted password with an encrypted password previously stored in a user table at the database server.

13. The method of claim 12, wherein an error message is generated and provided to the client if the verifying that the logon input is a valid logon input at the database server step cannot verify the logon input.

14. The method of claim 1, wherein the verifying at the database server that the session identification number and the portion of the logon input are valid step further includes verifying that a user identified by the portion of the logon input has the rights to perform the first function request.

15. The method of claim 1, wherein the generating and storing a unique session identification number at the database server step includes encrypting the session id before storing as the database server.

16. The method of claim 1, wherein the network is the Internet.

17. A system for securely accessing information from disparate data sources through a network, the system comprising:

a client having a volatile memory and enabled with a web browser, the client operable to exchange information and to communicate a request, and a session identification number and an account number that are stored in the volatile memory;

a network server operable to exchange information with the client and operable to receive the request, the session identification number, and the account number from the client, the network server enabled with a web server program that is operable to execute a script and to generate and provide information to the client in response to the request from the client;

a database server in communication with the network server and operable to receive the session identification number and the account number from the network server, the database server enabled with a database management system that is operable to execute a first function stored procedure in response to the execution of the script at the network server, the database server further including a user table, a check access stored procedure, the first function stored procedure, and a first function registered procedure, the first function stored procedure operable to execute the check access stored procedure to verify the session identification number and the account number with information in the user table and to execute the first function registered procedure to request information from a disparate data source; and a first disparate data source operable to exchange information with the database server in response to a request from the first function registered procedure.

18. The system of claim 17, wherein the database server further includes a logon stored procedure and a log off stored procedure.

19. The system of claim 17, further comprising:

a second client implemented as an interactive voice response system and operable to receive a user request and to store a session identification number and an account number, the second client further operable to communicate the user request, the session identification number, and the account number to the database server, the database server further operable to execute the first function stored procedure in response to the user request received from the second client.

20. A database server for use in a system for securely accessing information from disparate data sources through a network, the database server comprising:

a storage medium for storing a database management system, a check access stored procedure, a first function stored procedure, a first function registered procedure, and a user table; and a processor responsive to the database management system to:
receive a session identification number and an account number;
receive a request to execute the first function stored procedure;
execute the first function stored procedure in response to the request;
execute the check access stored procedure to verify the session identification number and the account number in the user table in response to executing the first function stored procedure; and
execute the first function registered procedure to request information from a disparate data source.

* * * * *